United States Patent [19]

Ishii et al.

[11] Patent Number: 5,291,005
[45] Date of Patent: Mar. 1, 1994

[54] APPARATUS FOR READING A MAGNETIC STRIPE ON A BOARDING PASS REGARDLESS OF THE ORIENTATION OF THE BOARDING PASS

[75] Inventors: Hiromoto Ishii, Mishima; Tsuyoshi Matsushita, Shizuoka, both of Japan

[73] Assignee: Tokyo Electric Co., Ltd., Tokyo, Japan

[21] Appl. No.: 577,460

[22] Filed: Sep. 4, 1990

[30] Foreign Application Priority Data

Sep. 7, 1989 [JP] Japan .................................. 1-232423

[51] Int. Cl.⁵ .............................................. G06K 7/08
[52] U.S. Cl. ................................... 235/449; 235/440; 235/493
[58] Field of Search ................. 235/449, 493, 382, 440

[56] References Cited

U.S. PATENT DOCUMENTS

| | | | |
|---|---|---|---|
| 3,602,697 | 8/1971 | Tanaka | 235/436 |
| 4,849,616 | 7/1989 | Mitote | 235/449 |
| 4,918,298 | 4/1990 | Tanabe et al. | 235/382 |

FOREIGN PATENT DOCUMENTS

| | | |
|---|---|---|
| 0291342 | 5/1988 | European Pat. Off. . |
| 1574678 | 10/1967 | Fed. Rep. of Germany . |
| 59-180626 | 10/1984 | Japan . |
| 60-132287 | 5/1985 | Japan . |
| 62-189588 | 8/1987 | Japan . |

OTHER PUBLICATIONS

Research Disclosure-Feb. 1988, Card Reader, vol. 286 *Abstract Only.

Primary Examiner—Eugene R. LaRoche
Assistant Examiner—Christopher R. Glembocki
Attorney, Agent, or Firm—Frishauf, Holtz, Goodman & Woodward

[57] ABSTRACT

A reader comprises a feeding path for boarding pass to be inserted in various orientations, pairs of feeding rollers for transporting the boarding pass along the path, and four sensor units arranged along the path each for sensing a signal recorded on the boarding pass inserted in a particular orientation. The reader also comprises a demodulation unit for demodulating each signal sensed by the sensor units, a monitoring circuit for determining which one of the sensor units of has sensed the recorded signal, a switch circuit, for electrically connecting the demodulation unit to the sensor unit which the monitor circuit determines has sensed the recorded signal, and a read circuit for reading flight information by extracting a series of digital data from each demodulated signal output by the demodulation unit and converting the series of digital data into the parallel form in accordance with the particular orientation of the boarding pass facing the sensor unit which the monitor circuit determines has sensed the recorded signal.

8 Claims, 4 Drawing Sheets

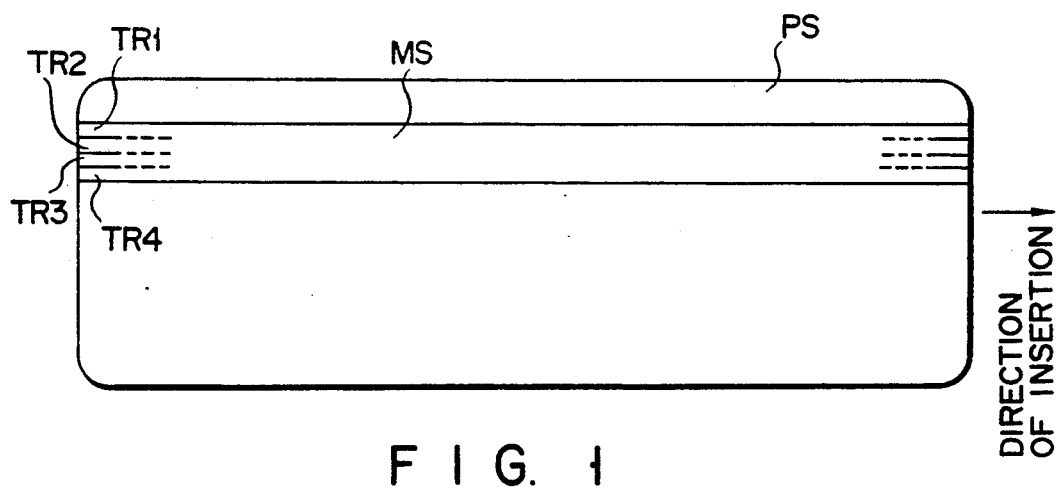
F I G. 1
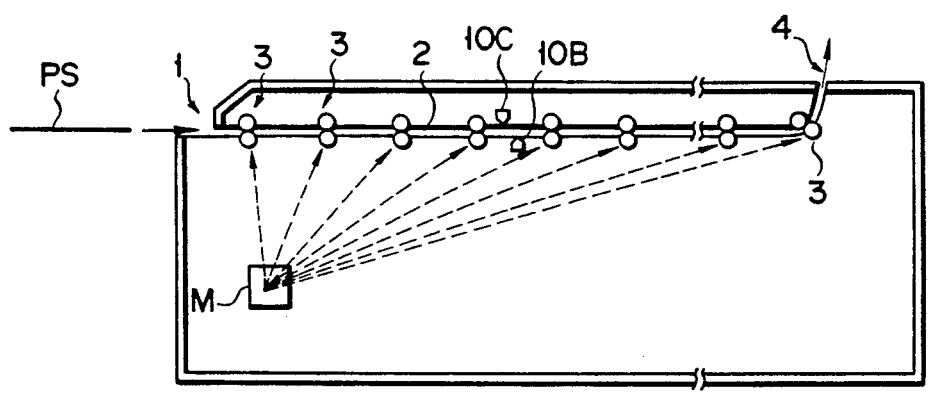
F I G. 2
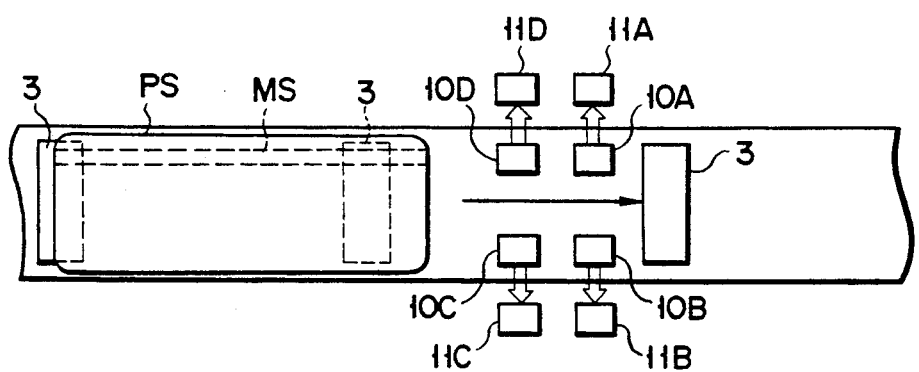
F I G. 3

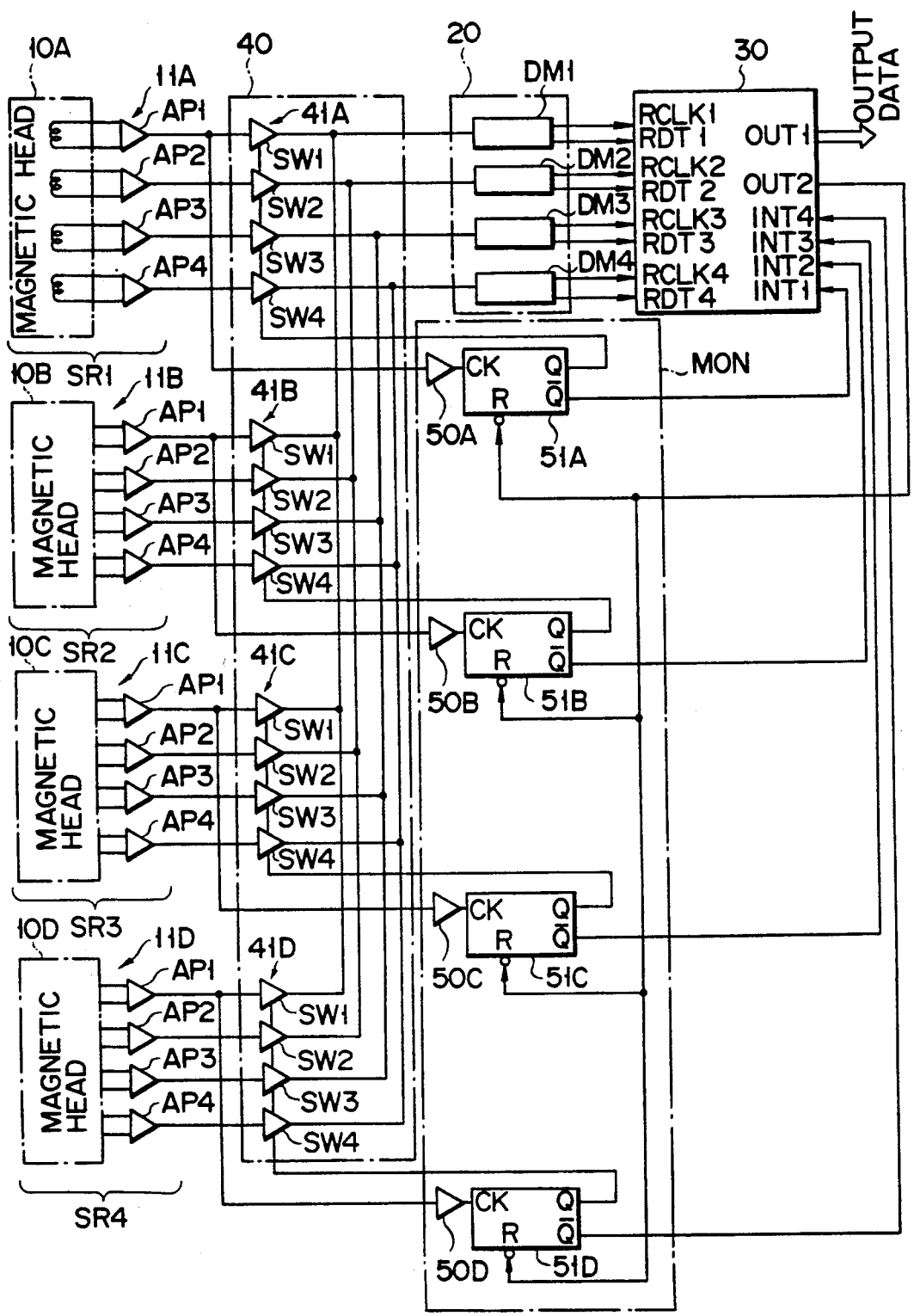
F I G. 4

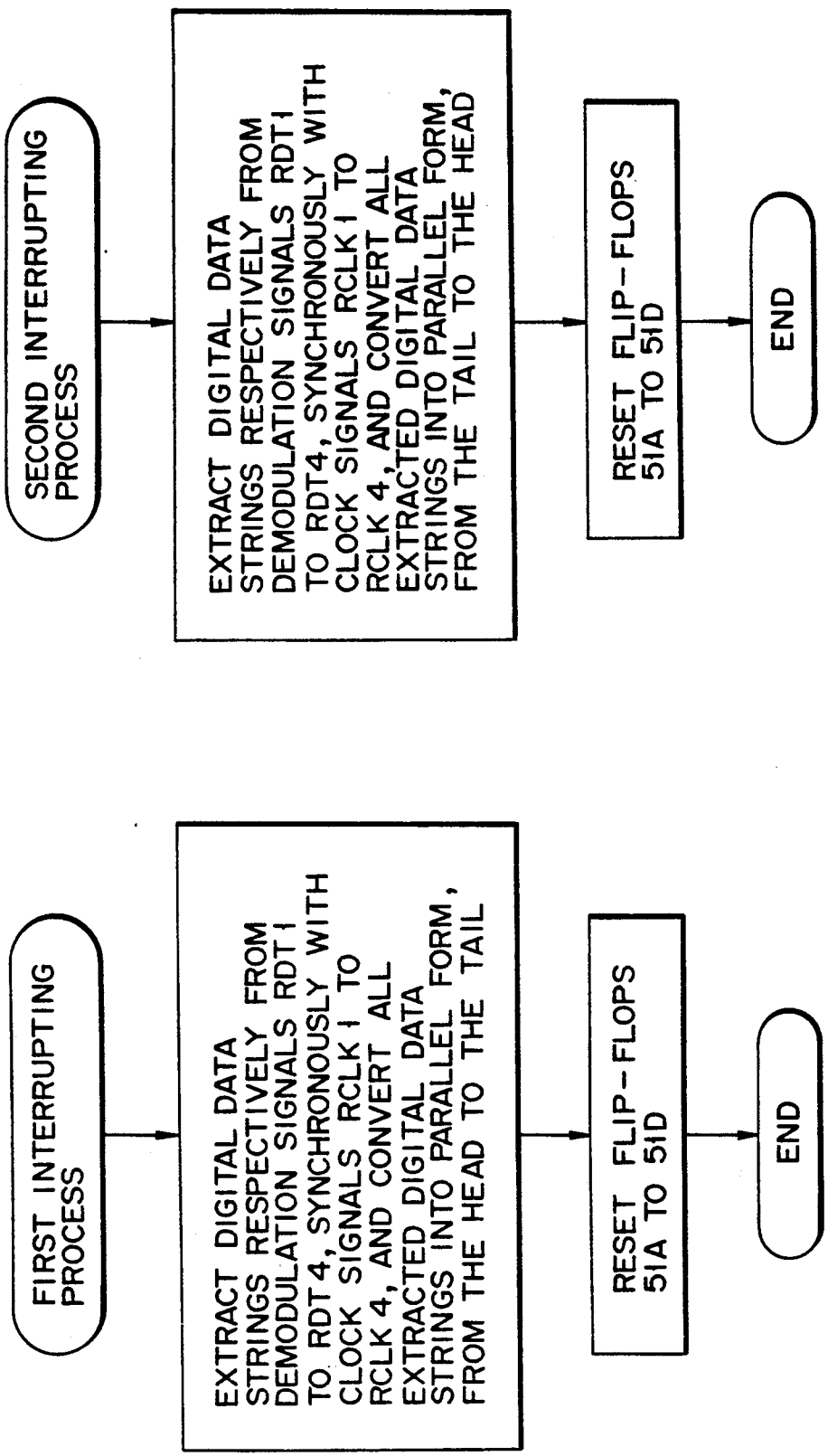

APPARATUS FOR READING A MAGNETIC STRIPE ON A BOARDING PASS REGARDLESS OF THE ORIENTATION OF THE BOARDING PASS

BACKGROUND OF THE INVENTION

1. Field of the Invention

This invention relates to a reader to read the information magnetically recorded on a card such as a boarding pass.

2. Description of the Related Art

A boarding pass having a magnetic stripe has recently come into use in airports in order to simplify the examination of tickets. As shown in FIG. 1, this magnetic stripe MS is bonded on the back of the boarding pass PS and stores the passenger flight information including a flight number, seat number, passenger name, tag number, etc. The flight information is recorded on the magnetic stripe MS through parallel-to-serial conversion and modulation. Some pieces of the information are printed o the surface of the boarding pass. Passengers receive boarding passe at the traveler's counter, advance to the boarding gate to the plane, and insert the boarding passes into the reader installed at the boarding gate. The reader reads the flight information from each boarding pass to confirm that the boarding pass is effective.

The reader has four magnetic heads and four demodulation units, which cooperate to read the flight information regardless of the orientation of the boarding pass inserted into the feeding path. The first and second magnetic heads are located under the feeding path and spaced apart in the widthwise direction of the path. The third and fourth magnetic heads are arranged above the feeding path and spaced apart in the widthwise direction of the path. The magnetic stripe of the boarding pass faces the first magnetic head when the pass is correctly inserted, the second magnetic head when it is inserted with the front side back, the third magnetic head when it is inserted inside out, and the fourth magnetic head when it is inserted the front side back and inside out. Each magnetic head detects the signal recorded on the facing magnetic stripe. Each demodulation unit demodulates the signal sensed by the corresponding magnetic head and supplies the demodulated signal to the read circuit. The read circuit includes a microprocessor, which reads the flight information by extracting a series of digital data from the demodulated signal and converts them into the parallel form.

Information can be read from the boarding pass at high speed, since the magnetic stripe MS consists of four tracks TR1 to TR4, and the flight information is divided into four groups recorded on four tracks, respectively. Therefore, each magnetic head is constructed so as to read signals from the four tracks simultaneously, and each demodulation unit includes four independent demodulation ICs for processing the signals read from the four tracks, respectively.

Hence, the reader has 16 demodulation ICs in all, making it difficult to render the reader compact or to reduce the manufacturing cost thereof. In future, the magnetic stripe will have more and more tracks because of fractionation of flight information. In this case, the above problem will be all the more serious.

Moreover, since the read circuit of the reader must respond to the signal output from any demodulation unit, it is not easy to modify the software for controlling the operation of the microprocessor incorporated in the read circuit. If the number of tracks is increased, the manufacturing cost will greatly increase because it is necessary to modify the software as well as the addition of hardware.

SUMMARY OF THE INVENTION

The object of this invention is to provide a reader which can read the information recorded on a card even if the card is incorrectly inserted and which can be manufactured a low cost.

According to this invention, there is provided a reader comprising a feeding path for cards to be inserted in various orientations; a feeding mechanism for advancing the card along the path; a plurality of sensors arranged on the path, each for sensing each signal recorded on the card inserted in a particular orientation; a demodulation unit for demodulating the signal detected by each sensor; a monitor circuit for monitoring the sensors to determine which one of sensors has sensed the recorded signal; a switch circuit for electrically connecting the demodulation unit to the sensor which the monitor circuit determines has sensed the recorded signal; and a read circuit for reading the information of interest by extracting a series of digital data from each demodulation signal output by the demodulation unit and converting the series of digital data into parallel form, in accordance with the particular orientation of the card corresponding to the sensor which the monitor circuit determines has sensed the recorded signal.

Sensors are arranged on the feeding path for sensing signals recorded on the cards inserted into the path in various orientations. If one of these sensors senses the signal recorded on a card, the monitor determines that the sensor has sensed the signal. The recorded signal is supplied to the demodulation unit through the connecting circuit. The orientation of an inserted card is identified when the monitor circuit confirms that the sensor has sensed the recorded signal. The read circuit extracts a series of digital data from the signal output by the demodulation unit, and converts the series of digital data into the parallel form according to the identified orientation. This operation allows the reader to read the information recorded on the card even if the card is inserted in a incorrect orientation. The recorded signal is sensed by one of the different sensors and supplied to the same demodulation unit. Since the reader does not require a plurality of demodulation units, it can be manufactured at low cost. Moreover, the read circuit can easily be adapted to design modification such as increase in the number of recording tracks on a card, since the circuit is not required to process signals other than the signal output by the signal demodulation unit.

BRIEF DESCRIPTION OF THE DRAWINGS

FIG. 1 shows the magnetic stripe formed on the back of a boarding pass;

FIG. 2 schematically represents the internal structure of a reader;

FIG. 3 is a plan view showing the magnetic head shown in FIG. 2 and the components located around the head;

FIG. 4 is a circuit diagram showing the reader;

FIGS. 7A and 7B are a flowchart explaining the first and second interrupting processes executed in the read circuit shown in FIG. 4.

DETAILED DESCRIPTION OF THE PREFERRED EMBODIMENTS

Figure 5:
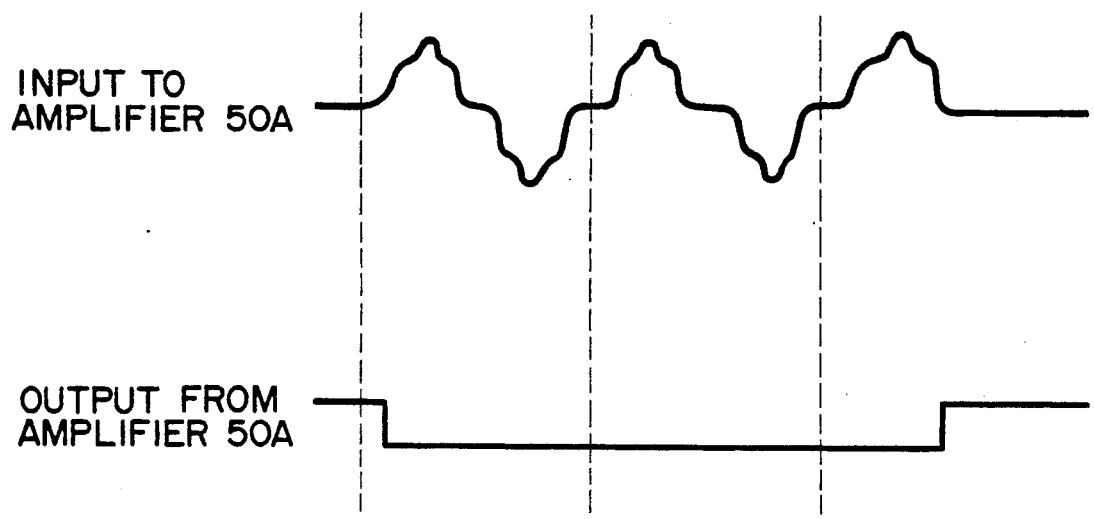
FIG. 5 shows the waveforms of the signals input to and output from the amplifier of the monitor circuit shown in FIG. 4.
Figure 6:
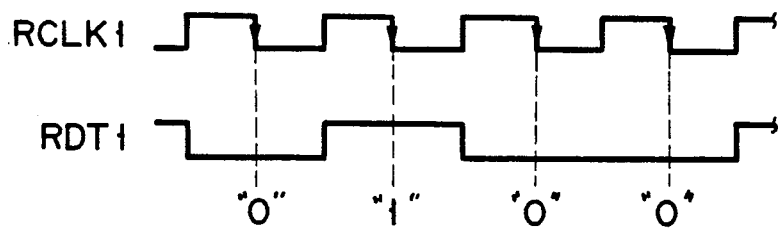
FIG. 6 shows the waveforms of the demodulation and clock signals input to the read circuit shown in FIG. 4.

A reader according to this invention will now be described, with reference to FIGS. 2 to 7.

FIG. 2 shows the internal structure of this reader. The reader has an inlet 1 where the existing boarding pas is inserted. The boarding pass is supplied from the inlet to a feeding path 2 and then to the outlet 4 along the path 2 by pairs of feeding rollers 3 arranged on the path 2. These feeding rollers 3 are driven by a motor M. As shown in FIGS. 2 and 3, magnetic heads 10A, 10B, 10C, and 10D are installed on the path 2. Magnetic heads 10A and 10B are located under the path 2, spaced apart in the direction of the widthwise direction thereof. Magnetic heads 10C and 10D are arranged above the path 2, spaced apart in the widthwise in the direction. (The magnetic heads 10A and 10D are not shown in FIG. 2 because they are located behind the magnetic heads 10B and 10C.) While the boarding pass PS is being carried, the stripe MS on the pass faces any one of the magnetic heads 10A, 10B, 10C, and 10D. The magnetic head 10A faces the magnetic stripe MS when the pass PS is correctly inserted. The magnetic head 10B faces the stripe MS when the pass PS is inserted with the front side back. The magnetic head 10C faces the stripe MS when the pass PS is inserted inside out. The magnetic head 10D faces the stripe MS when the pass PS is inserted with the front side back and inside out. The magnetic stripe MS comprises four tracks. Each of the magnetic heads 10A to 10D is designed to simultaneously sense the signals recorded in all tracks of the magnetic stripe. These magnetic heads 10A to 10D constitute sensor units SR1 to SR4 in combination with the amplifying circuits 11A to 11D, respectively. Each of amplifying circuits 11A to 11D comprises four amplifiers AP1 to AP4 for independently amplifying the signals which the corresponding magnetic head has read from four tracks.

This reader, as shown in FIG. 4, has a demodulation unit 20 for demodulating the four recorded signals sensed by each of the sensor units SR1 to SR4, a monitor circuit MON for monitoring the sensor units SR1 to SR4 to determine which one of sensor units has sensed the recorded signal, a switch circuit 40 for electrically connecting the demodulation unit 20 to the sensor unit which the monitor circuit MON determined has sensed the recorded signal, and a read circuit 30 for reading the flight information by extracting a series of digital data from each signal output by the demodulation unit 20 and for converting the series of digital data into the parallel data in accordance with the orientation of the boarding pass corresponding to the sensor unit which the monitor circuit determines has sensed the signals.

The switch circuit 40 has four switch groups 41A to 41D corresponding to the sensor units SR1 to SR4. Each switch group has four analog switches SW1 to SW4 connected to receive the signals output from the amplifiers AP1 to AP4 included in the corresponding sensor unit. The demodulation unit 20 has four demodulation circuits DM1 to DM4 corresponding to the number of tracks of the magnetic stripe MS. The demodulation circuit DM1 is connected t the output terminal of each analog switch SW1 of the switch groups 41A to 41D. The demodulation circuit DM2 is connected to the output terminal of each analog switch SW2 of the switch groups 41A to 41D. The demodulation circuit DM3 is connected to the output terminal of each analog switch SW3 of the switch groups 41A to 41D. The demodulation circuit DM4 is connected to the output terminal of each analog switch SW4 of the switch groups 41A to 41D. The demodulation circuits DM1 to DM4 are, for example, the demodulation ICs (Model TCL5010) made by TOHOKU KINZOKU KOGYO Co., Ltd. The signals output by amplifiers AP1 to AP4 are waveform-shaped and demodulated by the demodulation circuits DM1 to DM4, respectively, into the demodulation signals RDT1 to RDT4. The demodulation circuits DM1 to DM4 extract the clock components from the demodulation signals RDT1 to RDT4, thereby generating the clock signals CLK1 to CLK4 which are phase-adjusted to reproduce the demodulation signals RDT1 through RDT4 as the series of digital data "1" or "0". These demodulation signals RDT1 to RDT4 and the clock signals CLK1 to CLK4 are supplied to the read circuit 30.

The monitor circuit MON has the amplifiers 50A to 50D and flip-flop circuits 51A to 51D corresponding to the sensor unit SR1 to SR4. The amplifiers 50A to 50D amplify, rectify, smooth, and slice the signals output by the amplifiers AP1 of the sensor units SR1 to SR4, thereby generating signals at predetermined levels. These signals are supplied to the clock terminals of the flip-flop circuits 51A to 51D. For example, if the magnetic head 10A senses the recorded signal on the magnetic stripe MS of the boarding pass PS, the signal output by the amplifier AP1 is processed as shown in FIG. 5 and is output from the amplifier 50A. Each of the flip-flops 51A to 51D sets the output signal of the Q output terminal at "H" level and that of the $\overline{Q}$ output terminal at "L" level, at the trailing edge of the signal output by the amplifiers 50A to 50D. The Q output terminal of the flip-flop 51A is connected to the control terminal of the analog switches SW1 to SW4 of the switch group 41A, the Q output terminal of the flip-flop 51B to that of the analog switches SW1 to SW4 of the switch group 41B, the Q output terminal of the flip-flop 51C to that of the analog switches SW1 to SW4 of the switch group 41C, and the Q output terminal of the flip-flop 51D to that of the analog switches SW1 to SW4 of the switch group 41D. The $\overline{Q}$ output terminals of the flip-flops 51A to 51D are connected to the interrupt terminals INT1 to INT4 of the read circuit 30, respectively. The reset terminals of the flip-flops 51A to 51D are connected to the output port OUT2 of the read circuit. The flip-flops 51A to 51D respond to the reset signal supplied from the output port OUT2 of the read circuit 30, and set the output signal of the Q output terminal at "L" level and that of the $\overline{Q}$ output terminal at "H" level. The switches of groups 41A to 41D are "ON" while the output signals supplied by the Q outputs terminals of the flip-flops 51A to 51D are at "H" level. When the boarding pass PS is inserted into the inlet 1, the magnetic stripe MS faces any one of the magnetic heads 10A to 10D, but does not face other magnetic heads. Therefore, only one of the switch groups 41A to 41D can supply the signal output by a corresponding amplifying circuit among those of 11A through 11D to the demodulation unit 20.

The read circuit 30 comprises a computer including a microprocessor, a ROM, and a RAM. When any one of the interrupt terminals INT1 to INT4 is set at "L" level, the read circuit 30 obtains the flight information by extracting the digital data strings from the demodulation signals RDT1 to RDT4 supplied by the demodulation unit 20 synchronously with the clock signals RCLK1 through RCLK4, and by converting the digital data strings into the parallel form according to the boarding-pass orientation to be clarified by the interrupt terminal set at "L" level among those of INT1 to INT4. To be further detailed, the magnetic heads 10B and 10D face the magnetic stripe of this boarding pass PS when the boarding pass is inserted with the front side back, and traces the magnetic stripe in the direction opposite to the signal recording direction. The read circuit 30 confirms the boarding-pass orientation when the interrupt terminal INT2 or INT4 is set at "L" level, and converts the digital data string into the parallel data items, from the tail to the head, that is, in the opposite direction. The read circuit 30 checks the flight information obtained to determine whether or not the boarding pass is effective, and outputs the results from the output port OUT1. Moreover, the read circuit 30 reads the overall flight information from the demodulation signals RDT1 to RDT4 and then generates a reset signal from the output port OUT2. The reset signal puts the switch groups 41A to 41D into the non-continuity state, whereby the next boarding pass can be inserted. The microprocessor of the read circuit 30 performs the above operation, or the first and second interrupting processes shown in FIGS. 7A and 7B. The first interrupting process is performed when the boarding pass is not inserted with the front side back, whereas the second interrupting process is performed when the boarding pass is inserted with the front side back. The read circuit 30 also resets the flip-flops 51A through 51D when the power is turned on to bring the switch groups 41A through 41D into the non-continuity state.

It will now be described how the reader operates in accordance with the boarding-pass orientation.

First, assume that the boarding pass PS is correctly inserted into the inlet 1. When the boarding pass PS is transported by the feeding rollers 3 along the path 2, the magnetic stripe of the boarding pass PS faces the magnetic head 10A. The stripe is scanned while it is passing through by the magnetic head 10A. As the magnetic head 10A senses the signals from the tracks TR1 to TR4 of the magnetic stripe MS, the signals recorded on the track TR1 are supplied to the amplifier 50A of the monitor circuit MON from the magnetic head 10A through the amplifier AP1 of the amplifying circuit 11A. Then the signal output from the amplifier 50A falls, and the Q output signal of the flip-flop 51A rises to "H" level. When all analog switches SW1 to SW4 of the switch group 41A are brought into the continuity state, the signals recorded on the tracks TR1 to TR4 are supplied to the demodulation circuits DM1 to DM4 via the analog switches SW1 to SW4, respectively. The demodulation circuits DM1 through DM4 demodulate these signals. The demodulated signals RDT1 to RDT4, and clock signals RCLK1 to RCLK4 are supplied to the read circuit 30. The $\overline{Q}$ output signal of the flip-flop 51A falls to "L" level due to the fall of the signal output by the amplifier 50A, whereby the read circuit 30 executes the process shown in FIG. 7A. The read circuit 30 generates a reset signal. The reset signal is supplied to the flip-flops 51A to 51D at the final step, and is executed after the boarding pass PS passes through the magnetic head 10A. By this, the switch group 41A is brought into the non-continuity state, similarly to the switch groups 41B, 41C, and 41D.

Secondly, assume that the boarding pass PS is inserted into the inlet 1 with the front side back. When the boarding pass PS is transported by the feeding rollers 3 along the path 2, the magnetic stripe MS of the boarding pass PS faces the magnetic head 10B, and is scanned in the direction opposite to the signal recording direction, while the stripe is passing through the magnetic head 10B. As the magnetic head 10B senses the recorded signals from the tracks TR1 to TR4 of the magnetic stripe MS, the signal recorded on the track TR1 is supplied to the amplifier 50B of the monitor circuit MON from the magnetic head 10B through the amplifier AP1 of the amplifying circuit 11B. Then, the signal output from the amplifier 50B falls, and the Q output signal of the flip-flop 51B rises to "H" level. When all analog switches SW1 to SW4 of the switch group 41B are brought into the continuity state, the signals recorded on tracks TR1 to TR4 are supplied to the demodulation circuits DM1 to DM4 through the analog switches SW1 to SW4, respectively. The demodulation circuits DM1 to DM4 demodulate these signals. The demodulated signals RDT1 to RDT4, and clock signals RCLK1 to RCLK4 are supplied to the read circuit 30. The $\overline{Q}$ output signal of the flip-flop 51B falls to "L" level due to the fall of the signal output by the amplifier 50B, whereby the read circuit 30 executes the process shown in FIG. 7B. The read circuit 30 generates a reset signal, which is input to the flip-flops 51A to 51D at the final step, to be executed after the boarding pass PS passes through the magnetic head 10B. By this, the switch group 41B is brought into the non-continuity state similarly to the switch groups 41A, 41C, and 41D.

Thirdly, assume that the boarding pass PS is inserted into the inlet 1 inside out. When the boarding pass PS is transported by the feeding rollers 3 along the path 2, the magnetic stripe of the boarding pass PS faces the magnetic head 10C, and is scanned in the signal recording direction while the stripe is passing through the magnetic head 10C. As the magnetic head 10C senses the signals from the tracks TR1 to TR4, the signal recorded on the track TR1 is supplied to the amplifier 50C of the monitor circuit MON through the amplifier AP1 of the amplifying circuit 11C from the magnetic head 10C. Then the signal output by the amplifier 50C falls, and the Q output signal of the flip-flop 51C rises to "H" level. When all analog switches SW1 to SW4 of the switch group 41C are brought into the continuity state, the signals recorded on tracks TR1 to TR4 are supplied to the demodulation circuits DM1 to DM4 through the analog switches SW1 to SW4, respectively. The demodulation circuits DM1 to DM4 demodulate these signals. The demodulated signals RDT1 to RDT4, and clock signals RCLK1 to RCLK4 are supplied to the read circuit 30. The $\overline{Q}$ output signal of the flip-flop 51C falls to "L" level due to the fall of the signal output by the amplifier 50B, whereby the read circuit 30 executes the processing shown in FIG. 7A. The read circuit 30 generates a reset signal, which is supplied to the flip-flops 51A to 51D at the final step to be executed after the boarding pass PS passes through the magnetic head 10C. By this, the switch group 41C is brought into the non-continuity state, similarly to the switch groups 41A, 41B, and 41D.

Fourthly, assume that the boarding pass PS is inserted into the inlet 1 with the front side back and inside out. When the boarding pass PS is transported by the feeding rollers 3 along the path 2, the magnetic stripe of the boarding pass PS faces the magnetic head 10D, and is scanned in the direction opposite to the signal recording direction while the stripe is passing through the magnetic head 10D. As the magnetic head 10D senses the recorded signals from the tracks TR1 to TR4, the signal recorded on the track TR1 is supplied to the amplifier 50D of the monitor circuit MON through the amplifier AP1 of the amplifying circuit 11D from the magnetic head 10D. Then, the signal output by the amplifier 50D falls, and the Q output signal of the flip-flop 51D rises to "H" level. When all analog switches SW1 through SW4 of the switch group 41D are brought into the continuity state, the signals recorded on tracks TR1 to TR4 are supplied to the demodulation circuit DM1 to DM4 through the analog switches SW1 to SW4, respectively. The demodulation circuits DM1 to DM4 demodulate these signals. The demodulated signals RDT1 to RDT4, and clock signals RCLK1 through RCLK4 are supplied to the read circuit 30. The $\overline{Q}$ output signal of the flip-flop 51D falls to "L" level due to the fall of the signal output by the amplifier 50D, whereby the read circuit 30 executes the process shown in FIG. 7B. The read circuit 30 generates the reset signal, which is supplied to the flip-flops 51A through 51D at the final step to be executed after the boarding pass PS passes through the magnetic head 10D. By this, the switch group 41D is brought into the non-continuity state, similarly to the switch groups 41A, 41B, and 41C.

In the reader of this embodiment, the sensor units SR1 to SR4 are arranged on the path 2 so as to detect boarding passes inserted onto the path 2 in various orientations. If one of the sensor units SR1 to SR4 (e.g., SR1) senses the signals recorded on the boarding pass, the monitor circuit MON determines this fact, and the signals are supplied to the demodulation unit 20 through the switch circuit 40. The orientation of the boarding pass inserted is determined when the monitor circuit MON confirms that the sensor unit SR1 has sensed the recorded signals. The read circuit 30 extracts digital data strings from the signals RDT1 to RDT4 output from the demodulation unit 20 and converts these data strings into the parallel data, in accordance with the orientation. By the above operation, the flight information recorded on the boarding pass, in the form of signals, can be read even if the pass is inserted in an incorrect orientation. Each recorded signal is sensed by one of sensor units and supplied to the same demodulation unit 20. Since the reader does not require a plurality of demodulation units, it can be manufactured at low cost. Moreover, the read circuit 30 can easily be adapted to design modification such as increase of the number of recording tracks of a boarding pass, since the circuit is not required to process signals other than the output signal of the single demodulation unit 20.

What is claimed is:

1. A reading device for reading an information signal recorded on a card regardless of the orientation of the card relative to the reading device, the reading device comprising:

feeding path means for receiving a card to be inserted in one of various orientations;

means for advancing the card along the feeding path means;

a plurality of sensor unit means for sensing a signal recorded on said card, said plurality of sensor unit means being arranged on said feeding path means, such that each of said sensor unit means will sense said signal recorded on the card when said card is inserted in a particular respective orientation;

monitoring means for monitoring all of said sensor unit means to determine which one of said sensor unit means has sensed the signal;

a single demodulating means for demodulating the signal sensed by said sensor unit means;

connecting means for electrically connecting said single demodulating means to the one sensor unit means which said monitoring means determines has sensed the signal, to demodulate the signal sensed by said one sensor unit means; and reading means for reading information of interest by extracting a series of digital data from the signal output by said demodulating means and for converting the series of digital data into parallel form in accordance with the particular orientation of the card assigned to the one sensor unit means which said monitoring means determines has sensed the recorded signal.

2. A reading device according to claim 1, wherein said monitoring means includes a plurality of detecting circuits respectively connected to said plurality of sensor means, each for continuously generating a card detection signal in response to the signal supplied from a corresponding sensor unit means when the corresponding sensor unit means has sensed the recorded signal.

3. A reading device according to claim 2, wherein said connecting means includes a plurality of switching circuits, each connected between a corresponding sensor unit means and said single demodulating means, each for allowing the output signals of the corresponding sensor unit means to be supplied to said single demodulating means in response to the card detection signal generated from a corresponding detecting circuit.

4. A reading device according to claim 3, wherein said reading means is connected to said detecting circuits to determine which one of said detecting circuits has generated the card detection signal.

5. A reading device according to claim 4, wherein said reading means includes means for initializing said detecting circuits after the information of interest has been read.

6. A reading device according to claim 5, wherein each of said sensor unit means includes a multi-track magnetic head and amplifiers connected to said multi-track magnetic head, said single demodulating means includes a plurality of demodulators, and each of said switching circuits includes a plurality of switches respectively connected between the amplifiers of a corresponding sensor unit and the demodulators of said single demodulating means.

7. A reading device according to claim 6, wherein each of each of said detecting circuits is connected to receive the output signal of one of amplifiers of a corresponding sensor unit means.

8. A reading device according to claim 7, wherein each of said detecting circuits includes an amplifier and a flip-flop.

* * * * *